United States Patent Office 3,717,683
Patented Feb. 20, 1973

3,717,683
PROCESS FOR PREPARING HYDROQUINONE FROM p-NITROSOPHENOL
William von E. Doering, Cambridge, William J. Farrissey, Jr., Northford, Floro F. Frulla, Wallingford, and Adnan A. R. Sayigh, North Haven, Conn., assignors to The Upjohn Company, Kalamazoo, Mich.
No Drawing. Filed Jan. 12, 1970, Ser. No. 2,430
Int. Cl. C07c 37/00
U.S. Cl. 260—621 R                5 Claims

ABSTRACT OF THE DISCLOSURE

A novel process for preparing hydroquinone by conversion of p-nitrosophenol is disclosed.

BACKGROUND OF THE INVENTION

(1) Field of the invention

This invention relates to a process for the manufacture of hydroquinone and is more particularly concerned with conversion of p-nitrosophenol and its tautomeric form, p-benzoquinone monoxime, to yield hydroquinone.

(2) Prior art

The bulk of commercially available hydroquinone is manufactured by oxidation of aniline followed by reduction of the resultant quinone, with iron or manganese dioxide. Generally, these methods are also used to prepare substituted hydroquinones.

It is also known to prepare hydroquinone by reductive hydrolysis of p-nitrosophenol (Matsumura et al., J.A.C.S., vol. 53, p. 1407) employing iron filings as a reducing agent in hydrochloric acid media. This latter method results in a complex sludge mixture of iron salts and hydroquinone, which requires such separative techniques as to make the method unattractive for economic reasons.

A two step method for preparing hydroquinone from p-nitrosophenol, and substituted hydroquinone from corresponding nitrosophenols is disclosed in U.S. Pat. 3,395,-160 (McLean). By this process, the p-nitrosophenol is heated at a temperature above 150° C. with a carbonyl compound in acid, to yield the p-benzoquinone. In the second step, the p-benzoquinone is reduced by employing a reducing agent or by catalytic hydrogenation.

Surprisingly, we have found that hydroquinone can be prepared by a one-step process from p-nitrosophenol without employing external reducing agents or catalysts. It appears that our invention, which is this novel method, is specific for the preparation of hydroquinone and cannot be used to prepare substituted hydroquinones. The simplicity of our method makes it attractive commercially, since complex separative steps are not required to separate the hydroquinone from salts of a reducing agent as is necessarily in all the prior known methods.

SUMMARY OF THE INVENTION

This invention is of a process for preparing hydroquinone which comprises heating p-nitrosophenol to a temperature from about 60° C. to about 150° C. in an aqueous acidic medium.

Hydroquinone is a useful photographic developer, intermediate for photographic developers, and anti-oxidant [Encyclopedia of Chemical Technology, 2nd edition (1966), vol. 11, p. 483, Interscience Pub., New York, N.Y.].

DETAILED DESCRIPTION OF THE INVENTION

The hydrolysis of p-nitrosophenol is accomplished by heating in an aqueous acidic medium, and results in good yields of hydroquinone. p-Nitrosophenol is a well known compound, prepared by numerous methods which are equally well known, for example the method described in U.S. Pat. 2,074,127 (Moyer). A general method is by reacting nitrous acid with phenol in an alkaline aqueous solution. Current theory teaches that p-nitrosophenol exists as an equilibrium mixture of p-nitrosophenol and p-benzoquinone monoxime as illustrated by the formula:

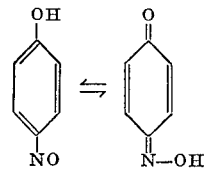

(I)

This invention is independent of the state of equilibrium in which p-nitrosophenol might exist and operates as well on the equilibrium mixture of nitrosophenol and oxime as it does on the pure nitrosophenol or oxime.

The aqueous acidic medium employed is an aqueous solution of a mineral acid such as sulphuric, phosphoric, and hydrochloric acid. The preferred acids are sulphuric acid and phosphoric acid. The concentration employed can be from 0.1 N to 6 N the preferred being 0.5 N to 3 N. The most preferred concentration of acid is 1 N.

Using conventional techniques and equipment, the p-nitrosophenol is mixed in the acid solution and heated to a temperature of about 60° C. to about 150° C. The preferred temperature range is about 80° C. to about 120° C. Heating is accomplished while the mixture is vigorously agitated preferably in an inert gas atmosphere, using standard techniques of agitation. Nitrogen gas is an example of an inert gas conveniently used. The reaction is complete in about 1 to 2 hours and can be monitored by such standard analytical techniques, for example, as vapor phase chromatographic analysis, gel permeation chromatography and ultra-violet spectral analysis. The hydroquinone is soluble in the reaction mixture, and is removed by conventional techniques well known in the art, such as extraction with ether solvent and subsequent isolation by evaporation of solvent.

The following examples describe the manner and process of making and using the invention and set forth the best mode contemplated by the inventors of carrying out the invention but are not to be construed as limiting.

EXAMPLE 1

To a 1 liter resin kettle is charged 1.04 gms. (0.085 moles) p-nitrosophenol and 250 cc. 1 N sulphuric acid. The kettle is placed upon an oil bath preheated to 125° C., and purged with nitrogen gas. The mixture is maintained at a temperature of about 115° C. to about 135° C. for about one hour during which time it is constantly agitated with a Vibro mixer, model E-1 (Chemapec Inc., Hoboken, N.J.). The Vibro mixer is a power unit causing vertical vibration of a stirrer at a frequency corresponding to A.C. power supply. The mixture is cooled to room temperature and filtered under a nitrogen atmosphere to remove 0.46 gm. of a black residue. The filtrate is extracted four times with 150 cc. portions of ethers, and the extracts combined. The extracts are washed with a saturated solution of sodium chloride and dried over anhydrous sodium sulfate. Upon evaporation of the ether, a residue of 0.3 gm. tan crystalline material remains. Gel Permeation Chromatographic Analysis indicates the residue to be 66% hydroquinone (21% yield).

Infra-red spectral analysis indicates good correlation with a hydroquinone standard. Recrystallization from hot water employing Norit A (decolorizing carbon, Fisher Scientific Co., Fairlawn, N.J.) gave a white crystalline solid having a melting point of 170–173° C. (uncorrected); a mixed melting point with an authentic recrystallized sample of hydroquinone did not give a melting point depression.

EXAMPLE 2

To a 2 liter Parr #4522 pressure reactor[1] equipped with a 1000 r.p.m. agitator, and modified by addition of a glass liner and removal of cooling coils, is charged 2.01 gms. (0.17 mole) p-nitrosophenol and 500 cc. 1 N sulphuric acid. The reactor is purged three times with nitrogen gas and charged with 20 p.s.i. nitrogen gas. The mixture is heated to a temperature of about 115° C. to about 150° C. for about one hour while constantly agitated. The mixture is then cooled to room temperature and filtered under nitrogen gas to remove a very small quantity of black tarry residue. The filtrate is extracted four times with 150 cc. portions of ether and the extracts combined. The combined extracts are washed with saturated solution of sodium chloride and dried over anhydrous sodium sulfate. Upon evaporation of ether, a residue of 0.8 gm. tan crystalline material is obtained, identified by Gel Permeation Chromatographic Analysis as 85% hydroquinone (36% yield). Infra-red spectral analysis shows excellent correlation with a hydroquinone standard.

EXAMPLE 3

Following the procedure of Example 2, but substituting 10 gms. (0.81 mole) of p-nitrosophenol for the 2.01 gms. used therein, there is obtained 2.45 gms. of tan crystalline material identified by Gel Permeation Chromatographic Analysis as 72% hydroquinone (20% yield). Infra-red spectral analysis shows excellent correlation with a hydroquinone standard.

EXAMPLE 4

Following the procedure of Example 3, but substituting 2.2 N phosphoric acid for the sulphuric acid as used therein, there is obtained 3.8 gms. tan crystalline material identified by Gel Permeation Chromatographic Analysis as 90% hydroquinone (36% yield). Infra-red spectral analysis shows excellent correlation with a hydroquinone standard.

We claim:
1. A process for the preparation of hydroquinone wherein a reaction mixture consisting essentially of p-nitrosophenol and at least about 1.5 moles, per mole of p-nitrosophenol, of an aqueous mineral acid having a concentration of from about 0.5 N to about 3.0 N, said acid being selected from the group consisting of sulphuric, phosphoric and hydrochloric acids; is heated to a temperature of about 60° C. to about 150° C.
2. The process of claim 1 wherein said mineral acid is sulphuric acid.
3. The process of claim 1 wherein said mineral acid is sulphuric acid having a concentration of 1 N.
4. The process of claim 1 wherein said mineral acid is phosphoric acid.
5. The process of claim 1 wherein said mineral acid is phosphoric acid having a concentration of 2.2 N.

References Cited

UNITED STATES PATENTS 3,395,160  7/1968  McLean _____ 260—396 R

OTHER REFERENCES

Matsumura et al., "Jour. Am. Chem. Soc.," vol. 52, pp. 1406–8 (1931).

Suzawa et al., "Chem Abstracts," vol. 58, p. 10653c (1954).

Bogoslovskii et al., "Chem Abstract," vol. 36, p. 2257[6] not a ref. (1942).

Kozlov et al., "Chem Abstracts," vol. 68, p. 4449h (1963).

LEON ZITVER, Primary Examiner

N. MORGENSTERN, Assistant Examiner

---

[1] Parr Instrument Company, Moline, Ill.